Nov. 17, 1931.   G. A. MILLAR   1,832,039
GLASS WORKING MACHINERY
Filed Sept. 23, 1926   4 Sheets-Sheet 3

INVENTOR
George A. Millar
BY
Thos. H. Brown
ATTORNEY

Nov. 17, 1931.   G. A. MILLAR   1,832,039
GLASS WORKING MACHINERY
Filed Sept. 23, 1926   4 Sheets-Sheet 4

INVENTOR
George A. Millar
BY
ATTORNEY

Patented Nov. 17, 1931

1,832,039

UNITED STATES PATENT OFFICE

GEORGE A. MILLAR, OF RIDGEFIELD PARK, NEW JERSEY, ASSIGNOR TO GENERAL ELECTRIC VAPOR LAMP COMPANY, OF HOBOKEN, NEW JERSEY, A CORPORATION OF NEW JERSEY

GLASS WORKING MACHINERY

Application filed September 23, 1926. Serial No. 137,181.

The present invention relates to glass working machinery which is particularly adapted for sealing-off and for tubulating hollow glass ware and further is adapted for holding and closing an open end of a glass tube so that air pressure therein may be regulated while its other end is being operated upon. It further relates to means in such a machine for making connection from a tube held thereby to a source of air pressure.

In the following description and in the claims parts will be identified by specific names for convenience, but they are intended to be as generic in their application to similar parts as the art will permit.

Various other objects and advantages of the invention will be obvious from the following particular description of one form of mechanism embodying the invention or from an inspection of the accompanying drawings; and the invention also consists in certain new and novel features of construction and combinations of parts hereinafter set forth and claimed.

Figure 1:
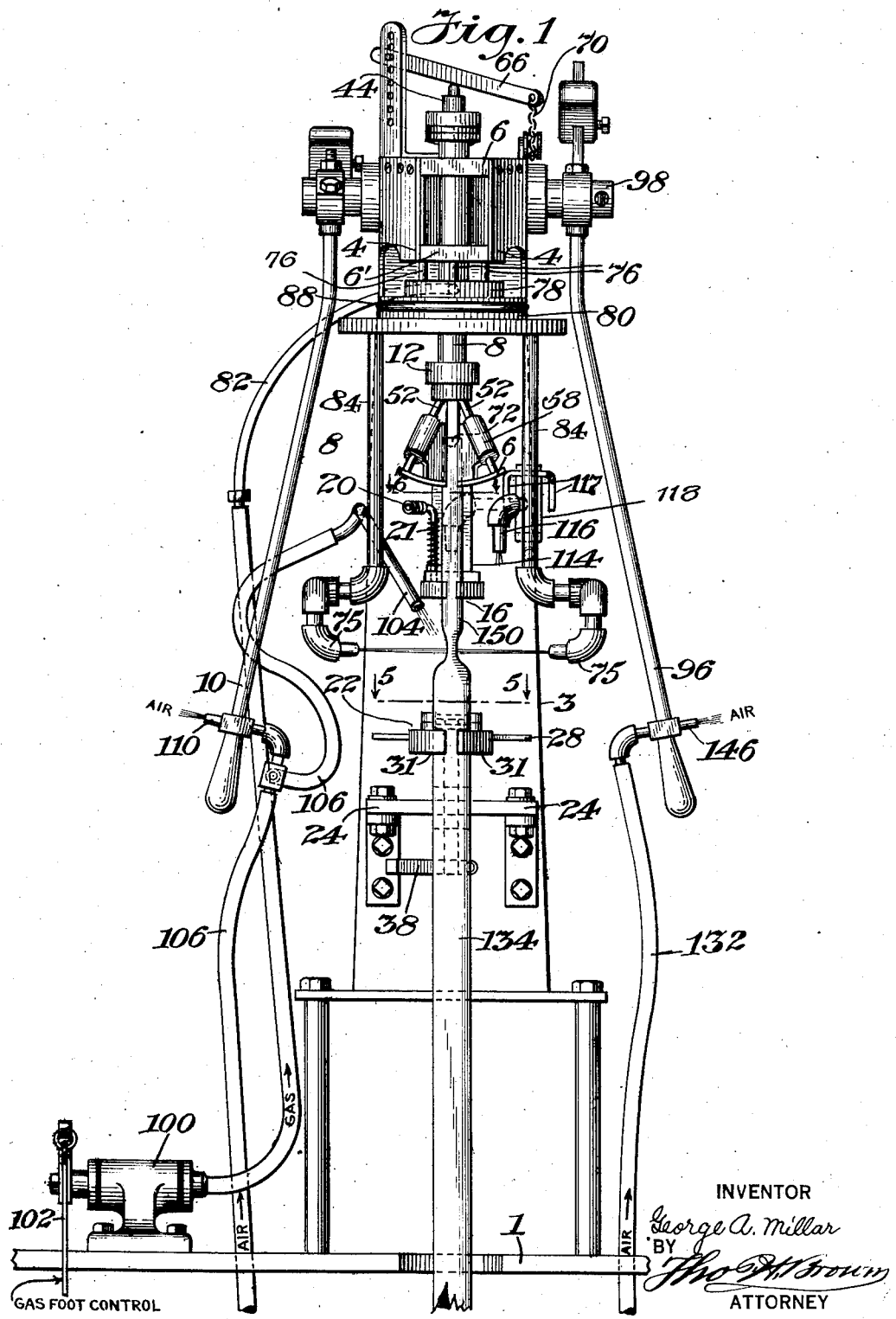
Figure 2:
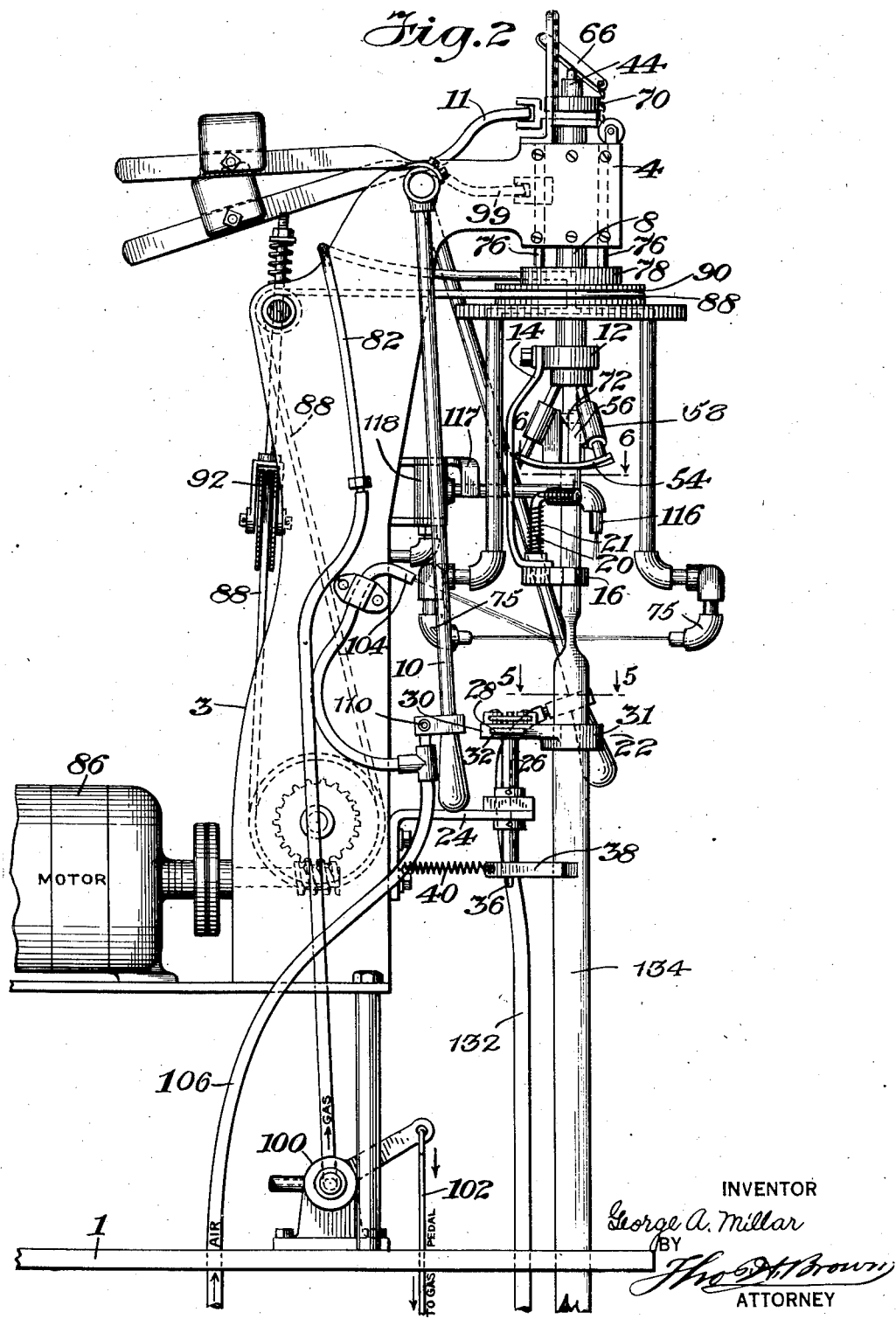
Figure 3:
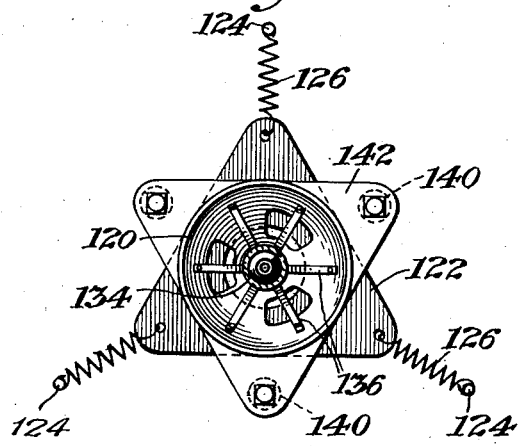
Figure 5:
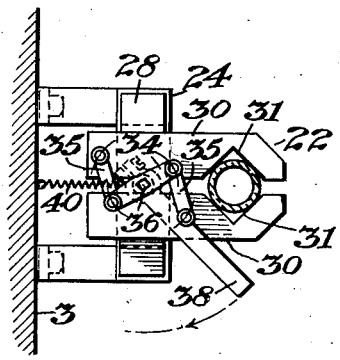
Figure 4:
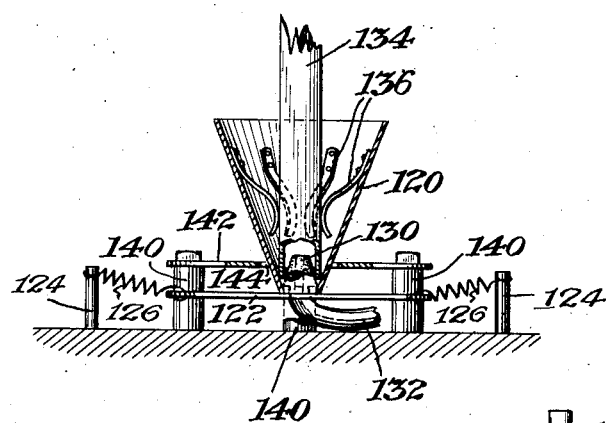
Figure 6:
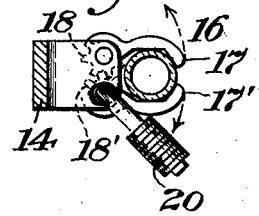
Figure 7:
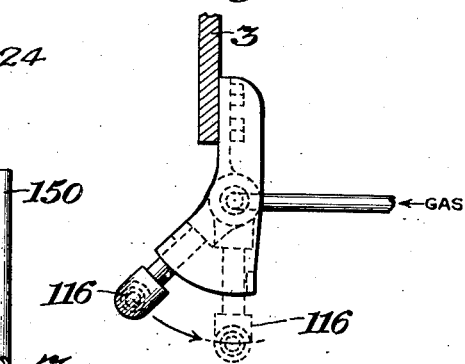
Figure 12:
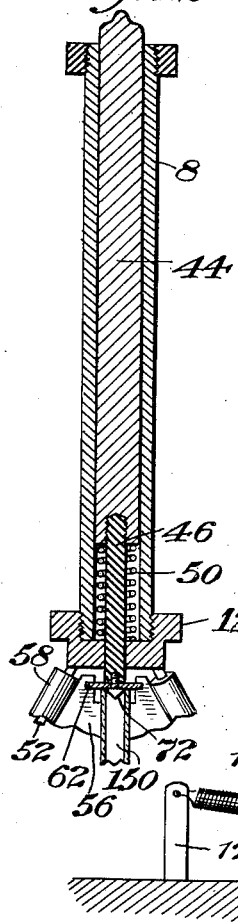
Figure 13:
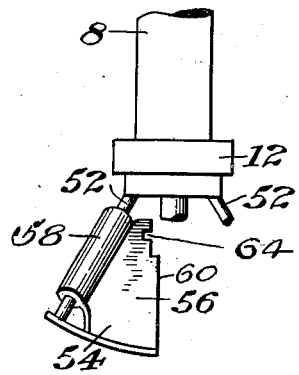
Figure 4:
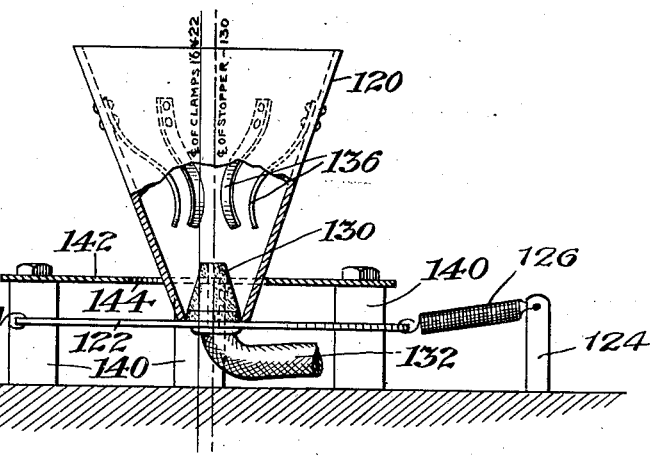
Figure 14:
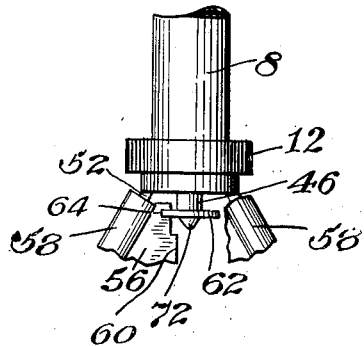

In the accompanying drawings I have shown for purposes of illustration one form of mechanism embodying the invention, in which Fig. 1 is a front elevation view of a glass working machine embodying elements of the invention, Fig. 2 is a side elevation view of the same machine, Fig. 3 is a plan view of a glass tube holding and closing means used with this machine, Fig. 4 is an elevation view in part section showing somewhat diagrammatically the holding means of Fig. 3, Fig. 4' is a diagrammatic view in elevation of an alternate arrangement of the parts of the holding means of Figs. 3 and 4, Fig. 5 is a view along the line 5—5 of Figs. 1 and 2 showing a tube clamp, Fig. 6 is a view along the line 6—6 of Figs. 1 and 2 showing another tube clamp, Fig. 7 is a view in plan showing details of a movable puncturing or spotting fire, Figs. 8, 9, 10 and 11 are sectional elevation views showing various steps in the working and forming of glass parts handled by the machine illustrated, Fig. 12 is an elevation view in mid-section showing details of a movable glass holding chuck and closing means and, Figs. 13 and 14 are elevation views of parts of the chuck of Fig. 12 showing further details.

In the drawings the stand or table 1 carries the support pillar 3 from the upper end of which project horizontally the pair of brackets 4, 4. A set of bearing members 6, 6' mounted between said brackets 4, 4 carries the vertical hollow shaft 8 which is slidable longitudinally in said bearings 6, 6' by handle lever 10 through suitable means such as the journaled lever 11 connected to said handle 10. A cap 12 fixed to the lower end of shaft 8 carries the downwardly extending bracket 14 which carries the horizontally disposed clamp 16 whose clamping area is aligned directly below the center of said shaft 8.

Said clamp 16 (see Fig. 6) comprises the jaws 17, 17' which are pivoted to said bracket 14 and are actuated by means of the intermeshing cogs 18, 18' formed integral with the jaw members 17, 17' respectively at their pivoted portion and by handle 20 fixed to jaw 17'. A spiral spring 21 about the stem of handle 20, fixed at one end to said stem and at its other to the bracket 14 tends to hold the clamp 16 in the closed position.

Directly below clamp 16 is clamp 22 (see Fig. 5) mounted to said pillar 3 through the bracket 24 by means of the hollow spindle or post 26 which extends vertically in both directions from bracket 24 and is secured thereto. Said post 26 carries at its upper end the flat bar or plate 28 about which slide the clamp plates 30, 30 each of which has formed at its outward end a clamping member 31. Said plate 28 extends through openings or mortises 32 formed through each of said bars 30, 30 whereby the latter are movable laterally toward and from each other in clamp opening and closing motion. Such movement is made by means of the bar 34 which pivotedly connects to each of said bars 30, 30 through respective links 35, 35 and by means of a stem 36 which is fixed to said bar 34 between the latter's pivotal connections to links 35, 35 and which extends downwardly through said sleeve 26. A handle 38 attached to spindle 36 at its lower end serves to actuate clamp 22 to close and open it by moving bars 31, 31 to and from each other and a tension spring 40 attached at one end to handle 38 and at its other end to pillar 3 tends to hold the clamp members in the closed position.

Referring particularly to Figs. 1, 2, 12, 13 and 14, said hollow shaft 8 carries and forms with other parts a clamping device and actuating means therefor comprising a spindle 44 which extends into shaft 8 with a sliding fit and carries at its lower end a smaller spindle 46 which extends through an annular cap 12 fixed to the lower end of shaft 8. The opening through hollow shaft 8 is in the form illustrated uniform throughout so that a space is left between the interior wall thereof and spindle 46 in which space is mounted about spindle 46 the compression spring 50 which presses against the bottom end of spindle 44 and against the inner face of cap 12 and tends to move said spindles 44 and 46 upwardly. Fixed to said cap 12 and extending radially therefrom at an angle to the axis of shaft 8 are a plurality, preferably four, of rods 52, 52 which are connected at their outer ends by the horseshoe shaped plate 54 which presents the opening at the front. On each of rods 52, 52 is slidably mounted a clamping member 56 which carries a boss 58 having an opening therethrough through which the respective rod 52 extends. As shown each of the members 56 is a flat plate having a vertical inner edge whereby the members 56, 56 present a plurality of vertical inner edges 60, 60 facing toward a common center and movable toward and from each other and adapted to clamp straight sided objects of various sizes such as glass rods or tubing.

Clamping and unclamping movement is imparted to the members 56, 56 by means of the member 62 which is mounted to the lower end of said vertically movable spindle 46 and which slidably engages the upper and lower surfaces of horizontal slots 64, 64 formed in respective members 56, 56 near the upper ends thereof. The inclination of said rods 52, 52 from the vertical causes members 56, 56 to moved toward and from each other horizontally as said member 62 bears against either upper or lower surfaces of said slots 64 respectively.

Said member 62 is actuated for moving members 56, 56 in clamping movement by said spring 50 which tends to move spindles 44 and 46 and said member 62 upwardly. Unclamping movement is imparted to the member 56, 56 by means of the lever 66 which can be made to bear on the upper end of said spindle 44 against the pressure of spring 50 by means of the chain 70 which is actuated by some suitable means such as a foot lever not shown.

At its lower end said spindle 46 also carries a closure member for glass tubing in the form of a conical piece of resilient material such as rubber or asbestos 72.

Between clamps 16 and 22 are mounted the rotatable gas jets 75, 75 which are carried by said brackets 4, 4 through the member 6', pins 76, 76 block 78 and the cooperating rotating head 80 which are channeled to carry gas from pipe 82 to the pipes 84, 84 which connect the jets 75 to said rotating head 80. Rotation is imparted to head 80 and jets 75, 75 by means of motor 86 and the belt 88 which rides in the annular groove 90 formed around head 80. The spring tightened sheave 92 serves to hold said belt 88 at a suitable tension when the fires 75, 75 and heads 78 and 80 are raised and lowered. Raising and lowering of the fires 75, 75 is achieved by means of handle 96 and shaft 98 which connect with said pins 76, 76 through suitable means as the lever 99.

Control of the flames of jets 75, 75 is had by means of valve 100 and a foot pedal not shown connected by rod 102.

A jet 104 for throwing a blast or cooling air onto glass which has been worked in fires from jets 75, 75 is mounted on standard 3 and is fed by the flexible hose 106. A by-pass 110 in pipe 106, mounted to handle 10, serves to control the flow of air from jet 104.

Onto standard 3 is mounted the piercing burner or jet 116 which can be swung into a position out of the way of jets 75, 75 when they are rotated and into another position over the center of clamp 22, see Figs. 1, 2 and 7. The arms 117, 117 of bracket 118 mounted to pillar 3 serve to limit the movement of said jet 116.

Below table 1 at a distance to suit the length of glass tubing to be worked and centered with said clamps 16 and 22 is a tube holding and closing device comprising (see Figs. 3 and 4) the frusto-cone 120 which is made of metal, asbestos or the like and which is carried by the plate 122 suspended between posts 124, 124 by the springs 126, 126. At its bottom said cone 120 carries the perforated stopper 130 of rubber, asbestos or the like which connects through the air hose 132 to a supply of air pressure not shown. Said stopper 130 is adapted for closing up the lower end of a glass tube 134 inserted into the cone 120 and for connecting the interior of the glass tube with hose 132 which in turn is connected to a suitable source of air pressure. The resilient springs 136, 136 carried on the interior of cone 120 serve to hold the end of glass tube 134 in place in the cone. The plate 142 mounted on posts 140, 140 and having the opening 144 therethrough extends about the lower part of cone and serves as a guide therefor. A by-pass from hose 132 terminating in the tube 146 mounted to handle 96 serves to control the air pressure in a tube mounted in cone 120 and onto said stopper 130.

Fig. 4' shows a modification of the device of Figs. 3 and 4 in which stopper 130 is mounted a little off center with respect to the centers of clamps 16 and 22 as indicated by the dot and dash center lines.

Figures 8, 9, 10, 11:
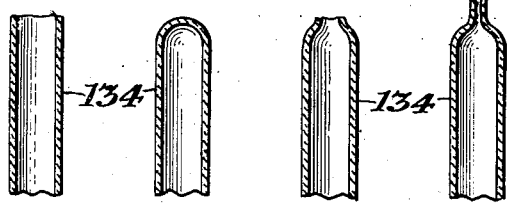

The apparatus above described is adapted for sealing off a glass tube such as shown in Fig. 8 to produce a uniform round and symmetrical closed end such as is shown in Fig. 9. The machine is further adapted for piercing a closed end tube such as that shown in Fig. 9 and for sealing a tubulation thereto (see Figs. 10 and 11). In a sealing off process the tube 134 is placed with its lower end in cone 120 and with the stopper 130 closing said lower end. The tube is held at a point below its upper end by the clamp 22 and the clamp 16 is moved into position by handle 10 and clamped about the tube just at its upper end. The fires 75, 75 are moved into position to impinge on the tube 134 between clamps 16 and 22 and the tube fused therewith. When the tube is sufficiently soft clamp 16 is raised by means of handle 10 to draw the fused glass out and to completely separate the part held by said clamp 16 from the main tube. Air pressure inside of tube 134 is controlled by regulating the flow from by-pass 146 at the end of tube 132 on handle 19 to work the molten glass at the top end of the tube 134 and the fires 75, 75 are rotated to produce a symmetrically closed end on the tube such as is shown in Fig. 9. The fires 75, 75 are then shut down and a stream or blast of air from jet 104 is caused to pass over the upper end of the tube by closing the by-pass 110, this for the purpose of cooling the molten glass at its end. When the end of the tube is sufficiently set the gas jet 116 is swung over until it is above the center of tube 134 and registers on the glass at the center of the end of the tube, this is then blown out as shown in Fig. 10 by raising the pressure in tube 134 by regulating the flow of air at by-pass 146. The jet 116 is then swung from over tube 134. Clamps 56, 56 are opened by pressing the foot pedal not shown which actuates chain 70, lever 66 and spindles 44, 46 and a length of small glass tubing 150 placed between the clamp members and against the stopper member 72 to close the upper end of the tube. Said foot pedal is then released to permit said spring 50 to move clamp members 56, 56 into clamping position and to hold the tube 150 against stopper 72. At the same time the lower part of the tube 150 is secured into said clamp 16. Through said handle 10 the lower end of tube 150 is brought down to a puncture in tube 134 and the fires 75, 75 are moved by means of handle 96 to bring them opposite the ends of the two tubes 134 and 150 and the flames thereof controlled by handle 96 to fuse the two tubes. By means of handle 10 tube 150 is brought against the puncture in tube 134, pressure within the tubes is regulated at by-pass 146, and the fires 75, 75 are moved through handle 96 to properly work the fused glass and seal the two tubes together to form a tubulation such as is illustrated in Fig. 11. After the sealing off thereof and before being permitted to cool tube 134 may be rotated in clamp 22 and on stopper 130 to aid in forming a uniform seal off. During the use of the fires 75, 75 they are rotated by means of said motor 86. By using the chuck of Fig. 4' in which the stopper 130 is offset a little from the projection of the center of clamp 22 uniform position in the fires of the upper ends of tubes which are crooked as well as of straight tubes is secured. Such position will always be uniform in a straight tube with respect to fires 75, 75 and by making the offset distance in accordance with a maximum or average variation in tube shape a practical uniformity in the shape of the seal off is secured.

While I have shown and described and have pointed out in the annexed claims certain novel features of the invention, it will be understood that various omissions, substitutions and changes in the forms and details of the device illustrated and in its operation may be made by those skilled in the art without departing from the spirit of the invention.

I claim:

1. In a glass working machine, in combination, a stopper for the end of a glass tube, and means for guiding said tube onto said stopper and for holding it thereon comprising a member in the shape of a hollow cone converging toward said stopper and spring members mounted in said cone and converging toward said stopper.

2. In a glass working machine, in combination, a stopper for the end of a glass tube, said stopper being perforate, means for applying air pressure through said perforate stopper to the interior of a tube closed by the stopper, and means for guiding said tube onto said stopper and for holding it thereon comprising spring members converging toward said stopper.

3. In combination, in a machine for working glass tubing, means for holding one end of a glass tube comprising a plate suspended between a plurality of springs, a conical member having its small end mounted to said plate and a stopper member for the glass tube within the said conical member.

4. In combination in a machine for working glass tubing, means for holding one end of a glass tube, and means for holding the other end of the tube comprising a plate suspended between a plurality of springs, a conical member having its small end mounted to said plate and having its large end facing the said holding means, and a stopper member for the glass tube within the said conical member.

5. In combination in a machine for working glass tubing, means for holding one end of a glass tube, and means for holding the other end of the tube comprising a plate suspended between a plurality of springs, a conical member having its small end mounted to said plate and having its large end facing the said holding means, a perforate stopper member within the said conical member and means for applying air pressure through said perforate stopper to the interior of the tube held thereby.

6. In combination in a machine for working glass tubing, means for holding one end of a glass tube, means for holding the other end of the tube comprising a plate suspended between a plurality of springs, a conical member having its small end mounted to said plate and having its large end facing the said holding means, a stopper member within the said conical member, and a guide member extending about the sides of said conical member.

7. In combination in a machine for working glass tubing, means for holding one end of a glass tube, and means for holding the other end of the tube comprising a plate suspended between a plurality of springs, a conical member having its small end mounted to said plate and having its large end facing the said holding means, a perforate stopper member within the said conical member, means for applying air pressure through said perforate stopper to the interior of the tube held thereby, a guide member extending about the sides of said conical member and means in said cone for steadying a glass tube therein comprising spring members extending toward the center of the cone.

8. In a machine for working glass tubing, in combination, means for closing and applying pressure at one end of a glass tube, means for guiding said tube onto said closing means and for holding said tube thereon comprising a plurality of spring fingers forming a discontinuous conical surface converging toward said closing means, means for holding the other end of said tube, and means for heating said other end.

9. In a glass working machine, in combination, a stopper for the end of a glass tube, and means to guide said tube onto said stopper comprising a plurality of spring fingers forming a discontinuous conical surface which converges toward said stopper.

Signed at Hoboken in the county of Hudson and State of New Jersey this 22nd day of Sept., A. D. 1926.

GEORGE A. MILLAR.